United States Patent [19]

Fulford et al.

[11] Patent Number: 5,027,891

[45] Date of Patent: Jul. 2, 1991

[54] METHOD FOR TRANSFERRING HEAT BETWEEN PROCESS LIQUOR STREAMS

[75] Inventors: George D. Fulford, Kingston, Canada; David R. Chinloy, St. Catherine, Jamaica

[73] Assignee: Alcan International Limited, Montreal, Canada

[21] Appl. No.: 175,046

[22] Filed: Mar. 30, 1988

[51] Int. Cl.$^5$ .............................................. F28D 15/00
[52] U.S. Cl. ......................................... 165/1; 165/95; 165/104.14; 165/104.21; 165/134.1; 165/909; 423/121; 266/168
[58] Field of Search ...................... 165/104.14, 104.21, 165/1, 909, 95, 134.1; 423/121; 266/168

[56] References Cited

U.S. PATENT DOCUMENTS

| | | |
|---|---|---|
| 2,119,091 | 5/1938 | Atkinson et al. ............... 165/104.21 |
| 3,497,317 | 2/1970 | Tusche . |
| 3,586,487 | 6/1971 | Juhasz et al. . |
| 3,738,411 | 6/1973 | Lazar . |
| 3,746,079 | 7/1973 | Arenson . |
| 3,986,340 | 10/1976 | Bivins, Jr. . |
| 4,180,127 | 12/1979 | Maxson . |
| 4,226,282 | 10/1980 | Kunsagi et al. . |
| 4,282,926 | 8/1981 | Holland . |
| 4,688,399 | 7/1986 | Reimann ........................ 164/104.14 |

FOREIGN PATENT DOCUMENTS

686182  1/1953  United Kingdom ........... 165/104.21

Primary Examiner—Albert W. Davis, Jr.
Attorney, Agent, or Firm—Cooper & Dunham

[57] ABSTRACT

A method of transferring heat between process liquor streams such as streams of caustic liquor in the Bayer process for producing alumina from bauxite, utilizing a heat pipe arrangement for heat exchange. The process streams respectively pass in contact with one surface of a first heat-exchange wall and one surface of a second heat-exchange wall while being isolated from the second surfaces of the two walls; these second walls are exposed to a closed volume (also isolated from both process streams) containing a heat transfer fluid that vaporizes below the temperature of the hotter process stream and condenses above the temperature of the cooler process stream. The heat transfer fluid vaporizes at the exposed surface of the wall contacted by the hotter stream, and condenses at the exposed surface of the wall contacted by the cooler stream, thereby transferring heat (as heat of vaporization) from the former stream to the latter.

7 Claims, 4 Drawing Sheets

METHOD FOR TRANSFERRING HEAT BETWEEN PROCESS LIQUOR STREAMS

BACKGROUND OF THE INVENTION

This invention relates to methods for transferring heat between process liquor streams, to effect simultaneous heating of one stream and cooling of another, while maintaining both of the streams in liquid phase. As used herein, the term "process liquor stream" refers to a flow of liquid (which may or may not contain solid particulate material, e.g. as a slurry) in an industrial or like process, under transport between successive process operations performed on or with the stream at respectively different temperatures. In an important particular sense, to which detailed reference will be made below for purposes of specific illustration, the invention is directed to methods for transferring heat between process liquor streams in the Bayer process for producing aluminum oxide from bauxite.

The need to transfer heat to or from liquors and/or slurries with a tendency to scale occurs frequently in the chemical and metallurgical industries, as, for example, in hydrometallurgical operations for the extraction of metal values from solid ores into alkaline or acidic extracting solutions. In many cases, as in the digestion of bauxite in the Bayer process, it is necessary to raise the temperature of the slurry to some extraction temperature well above atmospheric boiling point, and then cool the digested slurry back to approximately atmospheric boiling point before the insoluble solid residues can be separated.

In the Bayer process, bauxite ore is mixed with caustic liquor and treated ("digested") under conditions of elevated temperature and pressure to dissolve the aluminum oxide values in the ore as sodium aluminate. After digestion, the hot liquor or slurry, carrying insoluble ore material ("red mud") and dissolved sodium aluminate, is cooled, and the red mud is separated from the liquid of the slurry: the liquid, containing the dissolved sodium aluminate, commonly referred to as pregnant liiquor, is then cooled further and treated (as by seeding with aluminum hydroxide and stirring) to precipitate aluminum hydroxide. The coarsest part of this precipitate is separated out and ultimately calcined to obtain alumina as the end product, and the finer part is redirected as seed, while the remaining liquid ("spent liquor") is recycled, possibly evaporated and regenerated with addition of caustic, and heated to treat fresh quantities of bauxite.

To save energy costs, it is advantageous to effect as much as possible of the reheating of the spent and/or regenerated liquor by heat transfer from the hot digested slurry, which is to be cooled. That is to say, it is highly desirable to be able to recover the sensible heat from the digested slurry stream being cooled into the spent and/or regenerated liquor stream being heated as completely as possible so as to economize to the greatest possible extent on the quantity of heat which has to be supplied from an external source (almost always derived from burning a relatively expensive fuel).

Theoretically, the heat exchange might be effected through a heat-exchange wall such as a heat-conductive tube or plate having opposite surfaces respectively in contact with countercurrent flows of the digested slurry and spent/regenerated liquor streams. Problems of scale formation, however, have prevented successful use of such arrangements. Scale from the caustic slurry and spent/regenerated liquor streams deposits on both surfaces of the heat exchange structure, decreasing its thermal transmissivity; and while the scale can be removed from one such surface (especially, from the inside of a cylindrical conduit), removal of scale from the opposite surface, in a heat exchanger of otherwise practicable design, is extremely difficult and inconvenient.

Thus, while it would be very desirable to accomplish the heat exchange by slurry-slurry or slurry-liquor heat transfer, there is a real problem of finding suitable equipment in which to accomplish this, because of the well-known tendency of these streams to produce tenacious heat-insulating scales on heating surfaces, which must be cleaned periodically; the problem is especially severe for operation in the temperature ranges in which scales (such as calcium titanates) are formed which are difficult or impossible to remove in practice by chemical means, so that mechanical or high-pressure liquid jet cleaning has to be used. In the case of shell and tube exchangers, scale could form on both sides of the tubes; while the inside surfaces of the tubes could be cleaned mechanically or by jetting (hydraulically) as they are now, the outside surfaces are largely inaccessible even in heaters with removable bundles. Plate heat exchangers, for which all surfaces are readily accessible, might seem to answer the need, but in fact plate heat exchangers are applicable over only a limited range of pressures due to gasket problems, especially in the larger sizes, and the close clearances involved between the plates and at the feed and offtake points make their use problematic in the case of abrasive slurries.

At present, most Bayer plant circuits accomplish transfer of heat between the caustic process liquor streams by carrying out the cooling of the digested slurry (which is initially at elevated pressure) by flashing the slurry stepwise, at gradually decreasing pressures, collecting the steam flashed at each pressure level, and condensing the steam on the shell side of shell and tube heat exchangers (or on the jacket side of concentric tube digesters) for heating the liquor or slurry passing to or through the digesters. After separating the red mud residue, further heat exchange is carried out between the pregnant and spent liquor streams to cool the former to the temperature required for precipitation, and typically this is effected by a comparable flashing/heat exchanger system operating at below atmospheric pressure ("vacuum heat exchanger"). This procedure has two main advantages: first, provided that carryover of spray droplets with the flashed steam is eliminated or avoided by suitable design of the flash tanks and mist separators, the shell side of the heat exchanger or the jacket side of the tube digester is in contact only with condensing steam, and apart from impurities dissolved in the steam (e.g. steam-distilled complexes) there is relatively little danger of formation of scale on this side of the heat transfer surface; and second, the steam which is condensed in the heat exchanger shells or the tube digester jackets is removed from the system, thereby aiding the water balance of the process by providing evaporation.

However, the flashing method of heat recovery suffers from significant thermal disadvantages. Because of the nature of the flashing process, and because the boiling point of the aqueous caustic liquor is elevated above that of water, the recovered heat is degraded by the boiling point elevation of the solution being flashed, which may be of the order of 15° C. (above that of water) when high caustic concentrations are used in digestion, and even at relatively low caustic concentrations in digestion is still of the order of 5° C. Hence, even assuming no fouling of the heat transfer surfaces and a very large heat transfer area per heater and very many stages (i.e., even assuming the limiting case of zero approach temperature difference in the exchanger and an infinite number of stages) the minimum temperature that the digested slurry can achieve in digestion systems fed with liquors with high caustic concentrations, will be of the order of 15° C. higher than if the heat had been recovered between the streams by means of slurry-liquor or slurry-slurry surface heat exchange, with comparable fouling and heat transfer area. In addition, since it is impractical to have an infinite number of heat recovery stages, in industrial practice there is a finite temperature drop (typically of the order of 10° C.) as the slurry being cooled passes from one stage of flashing to the next. Thus, the temperature of the cooled digester slurry achieved in industrial practice using a heat recovery system of flashing stages in series is up to about 25° C. hotter in the high caustic concentration case than the thermodynamic minimum achievable in a heat recovery system of countercurrent surface heat exchangers. The heat equivalent of this unrecovered 25° C. has to be supplied to the entire digestion flow at the maximum digester temperature (i.e., as high grade heat), at considerable additional cost for energy.

Moreover, flashing from a pregnant stream in the Bayer process concentrates the liquor (in terms of caustic and alumina concentrations, but not, unfortunately, with respect to the ratio of alumina to caustic) between digestion and precipitation, whereas to maximize the liquor productivities in digestion and in precipitation it is desirable to avoid any concentration of the liquor passing from the former to the latter. Achieving evaporation by flashing from the pregnant liquor in digestion (and in vacuum cooling) is therefore counterproductive to maximum liquor productivity in the circuit and is paid for in terms of reduced energy efficiency elsewhere in the circuit, nor is it usually possible to achieve as much evaporation per unit of energy expended in the flashing systems designed for cooling as in an evaporator (on the spent side of the circuit) which is specifically designed for evaporating. It will be apparent that in the case of a high-caustic flow system involving an evaporator on the spent side of the circuit which will normally be quite large enough to provide all the mud and hydrate washing water that can be economically justified (except possibly in the case of very poor grade bauxites with exceptionally large mud factors), the additional evaporation due to flashing in digestion and vacuum cooling has little economic value in any case.

Tube digesters are known to be useful in hydrometallurgical operations for the extraction of metal values from solid ores into alkaline or acidic extracting solutions, especially where the extraction has to be carried out at temperatures giving rise to pressures above atmospheric, as is the case in the Bayer process extraction of alumina from bauxite into caustic soda or caustic-aluminate solutions. Among the advantages of the tube digester are the close approach to plug flow, minimization of bypassing, the high degree of turbulent mixing of the solid and liquid phases, and the fact that by enclosing the tube in a second larger tube carrying a heating or cooling medium (or several parallel tubes in a common jacket), it is possible to simultaneously effect heat transfer to or from the slurry during the extraction process.

As described for example in U.S. Pat. No. 3,497,317, concentric tube-tube digesters have been proposed for the Bayer process. In such service, however, the outside surface of the inner tube scales as well as the inner surface (which can be cleaned), and since the outer surface is enclosed by the annular jacket, it is not readily accessible for cleaning by other than chemical means by the circulation from time to time of a descaling liquid of a suitable type through the jacket space. In addition, dismantling the concentric tube device is difficult once this outer surface becomes scaled. These problems (representing a specific instance of the above-described scaling difficulty associated with indirect heat exchange between caustic process liquor streams in contact with opposite surfaces of a tube or other heat-exchange wall), have prevented successful commercial Bayer process operation of tube digesters in the direct slurry-liquor or slurry/slurry heat exchange mode, although tube digesters are in use with flashed steam on the jacket side, with the disadvantages noted above.

The abovedescribed difficulties associated with heat transfer between digested slurry and spent liquor in the Bayer process exemplify some of the types of problems that can be overcome or minimized by the present invention. Other problems also overcome by the invention, in diverse environments of use, are discussed below.

SUMMARY OF THE INVENTION

The present invention broadly contemplates the provision of a method for transferring heat from a first process liquor stream to a second process liquor stream which is initially at a temperature lower than that of the first stream, comprising the steps of passing the first and second streams in contact with, respectively, a first surface of a first heat-transmissive wall and a first surface of a second heat-transmissive wall, each of the walls having a second surface which is opposed to the first surface thereof and is exposed to a closed volume for containing a fluid, the streams being isolated from each other, from the second surfaces of both walls, and from the volume; maintaining a preselected gas pressure within the volume; and maintaining, in the volume, a liquid-state body of a fluid heat transfer medium in contact with the second surface of the first wall but only partly filling the volume, the medium and the pressure being mutually selected such that at the selected pressure, the medium has a boiling point lower than the initial temperature of the first stream but higher than the initial temperature of the second stream such that the medium in the volume is partially in vapor state owing to transfer of heat to the body from the first stream through the first wall, the second surface of the second wall being disposed for condensation thereon of vapor-state transfer medium in the volume by transfer of heat to the second stream through the second wall, with return of condensed transfer medium from the second surface of the second wall to the body of the liquid heat transfer medium in the volume.

In some instances, as where the process streams to be heated and cooled respectively enter the heat exchanger zone at temperatures below and above 100° C., the heat-transfer medium may be water and the pressure maintained in the closed volume may be 1 atm., no positive steps of establishing or adjusting pressure being then required. If the entering temperature of the hotter process stream is somewhat below 100° C., water may still be used as the transfer medium, provided that a suitable subatmospheric pressure is established and maintained in the closed volume, or another fluid having a suitably lower ambient-pressure boiling point may be used, with a closed-volume pressure of 1 atm. In this sense, in accordance with the invention, the fluid heat-transfer medium and the pressure maintained within the closed volume are mutually selected to achieve the requisite relationship between fluid medium boiling point (at the preselected pressure) and process stream temperatures.

In currently preferred embodiments of the invention, the second wall is disposed above the first wall, and the closed volume is arranged for free fluid communication between the respective second surfaces of these walls. Thus, vapor-state transfer medium rises from the liquid-state body (which is in contact with the first wall) to the exposed second surface of the second wall within the closed volume, and condensed (liquid-state) transfer medium returns by gravity from the second wall to the body. This heat transfer arrangement functions as a heat pipe: heat of vaporization is taken up by the fluid transfer medium from the first stream through the first wall; the heat is effectively transported (as latent heat of vaporization) by the ascent of the vapor-state transfer medium to the second wall, and is given up (upon condensation of the fluid medium) to the second stream through the second wall. Thereby, the first stream is cooled while the second stream is heated.

Advantageous applications of the invention include, without limitation, hydrometallurgical and other processes wherein heat is to be transferred between process liquor streams that tend to deposit scale on surfaces with which they come into contact. With the present invention, only one surface of a given heat-transmissive or heat-exchange wall is in contact with either of the process streams, the other surface of the wall being in contact with the fluid transfer medium, which may (depending on the temperatures involved) be distilled water or other fluid that does not deposit scale. It will be understood that the term "scale," as used herein, refers to any deposit from a process stream that forms on a wall in contact with the stream and reduces the heat transmissivity of the wall. A "liquor that deposits scale" is any process liquor that deposits such scale on a wall with which it comes in contact.

Since only one surface of any wall is in contact with any scale-depositing liquor stream, the heat exchange structure used may be of a design that enables ready removal of scale. For example, each of the aforementioned walls may be a cylindrical conduit, through the interior of which one of the process liquor streams passes, the second-stream (initially cooler) conduit being disposed above the first-stream conduit; and the two conduits may be laterally enclosed together within a third, larger conduit or jacket defining the aforementioned closed volume and partially filled with a non-scale-forming fluid heat transfer medium. Scale then forms on the inner cylindrical surfaces of both conduits, but as explained above, removal of scale from these surfaces can readily and adequately achieved by known techniques. The outer surfaces of the conduits, from which it would be very difficult if not impossible to remove scale owing to their enclosure by the third conduit or jacket, have no scale deposited on their surfaces. At the same time, the efficacy of heat transfer is comparable to that attainable in a conventional indirect heat-exchange system between flowing liquid streams respectively in contact with opposite faces of a heat-exchange wall, because heat-pipe operation closely approaches isothermal heat transfer conditions.

Typically or preferably, the conduits extend generally horizontally. Moreover, each "wall" may be a plurality of conduits, e.g. arranged in parallel. Thus, the first stream may flow through a first plurality of conduits, and the second stream may flow through a second plurality of conduits, all surrounded by the third conduit or jacket, with the first plurality of conduits disposed below the second plurality of conduits and immersed in a body of fluid heat-transfer medium contained within the third conduit. Whether each "wall" is one or plural conduits, however, the process streams contact only the descalable inner surfaces of the conduits, and only the non-scale-forming fluid heat transfer medium contacts the outer surfaces of the conduits.

In addition, when each "wall" is constituted of one or plural conduits (e.g. extending generally horizontally, with the "cold" stream conduit or conduits above the "hot" stream conduit or conduits), a plurality of closed volumes isolated from each other may be respectively provided by a plurality of volume-defining jackets disposed in spaced tandem relation to each other along the length of the conduits, each of the volumes containing a body of a fluid heat-transfer medium in liquid state, with different equilibrium pressures respectively maintained in different ones of the volumes.

In particularly important specific aspects, the invention contemplates the provision of methods of heat transfer between caustic liquor streams in the Bayer process for producing alumina ($Al_2O_3$) from bauxite, where a slurry of bauxite in caustic liquor is digested at high temperature and pressure to dissolve alumina values as sodium aluminate. Stated generally, the method of the invention may be employed to transfer heat between any process liquor streams in a Bayer process system as to which such heat transfer is desired. As an exemplary and valuable (but non-limiting) instance of these aspects of the invention, in procedure for transferring heat from the hot digested slurry or pregnant liquor through two heat exchange walls to fresh caustic bauxite slurry or spent liquor while inhibiting creation of scale on more than one surface of each such heat exchange wall, the method of the invention comprises causing the hot digested caustic slurry or pregnant liquor to pass in contact with one face of a heat exchange wall and thereby transferring heat from the digested slurry or pregnant liquor to a heat transfer fluid in contact with the other face of the wall, and causing spent liquor or fresh caustic bauxite slurry to pass in contact with one face of another heat exchange wall while presenting the aforesaid heated heat transfer fluid into contact with the other face of the last-mentioned wall, whereby heat from the digested slurry or pregnant liquor is transferred into the fresh caustic slurry or spent liquor, the transfer fluid being non-scale-forming and the heat exchange walls being each exposed to caustic liquor or slurry on only one face thereof. The transfer fluid is essentially in liquid state when it receives heat from the hot slurry or liquor through the first-mentioned wall and is thereby vaporized, and the aforementioned transfer of heat from the transfer fluid occurs from vapor state of the latter and comprises condensation at the second-mentioned wall, the transfer fluid thereby returning to liquid state, and the transfer fluid in the last-mentioned liquid state being recycled to the body of transfer fluid in liquid state that is in contact with the first-mentioned wall, the heat thus transferred from the digested slurry or pregnant liquor to the fresh slurry or spent liquor thus comprising heat of vaporization of the non-scale-forming transfer fluid.

Stated with reference to its application to heat exchange between Bayer process liquor streams, the method of the invention renders scale-forming problems manageable because each heat exchange wall is exposed to scale-forming liquid only at one face, which can be designed to facilitate scale removal. At the same time, it avoids disadvantages of currently used flash heat exchange techniques, including the limitation of efficacy resulting from the high boiling point elevation of the caustic liquor, and the undesired concentration of the digested slurry stream, because it does not involve vaporization of either of the caustic liquor streams between which heat is being transferred.

Further features and advantages of the invention will be apparent from the detailed description hereinbelow set forth, together with the accompanying drawings.

DETAILED DESCRIPTION

The invention will be initially described as embodied in a method for effecting heat transfer between caustic process liquor streams in an otherwise generally conventional instance of practice of the Bayer process. In explanation of this environment of use, reference may be made to FIG. 1, which shows in diagrammatic or flowsheet form an example of a known Bayer process system utilizing a prior art heat exchange arrangement for performing such heat transfer.

Figure 1:
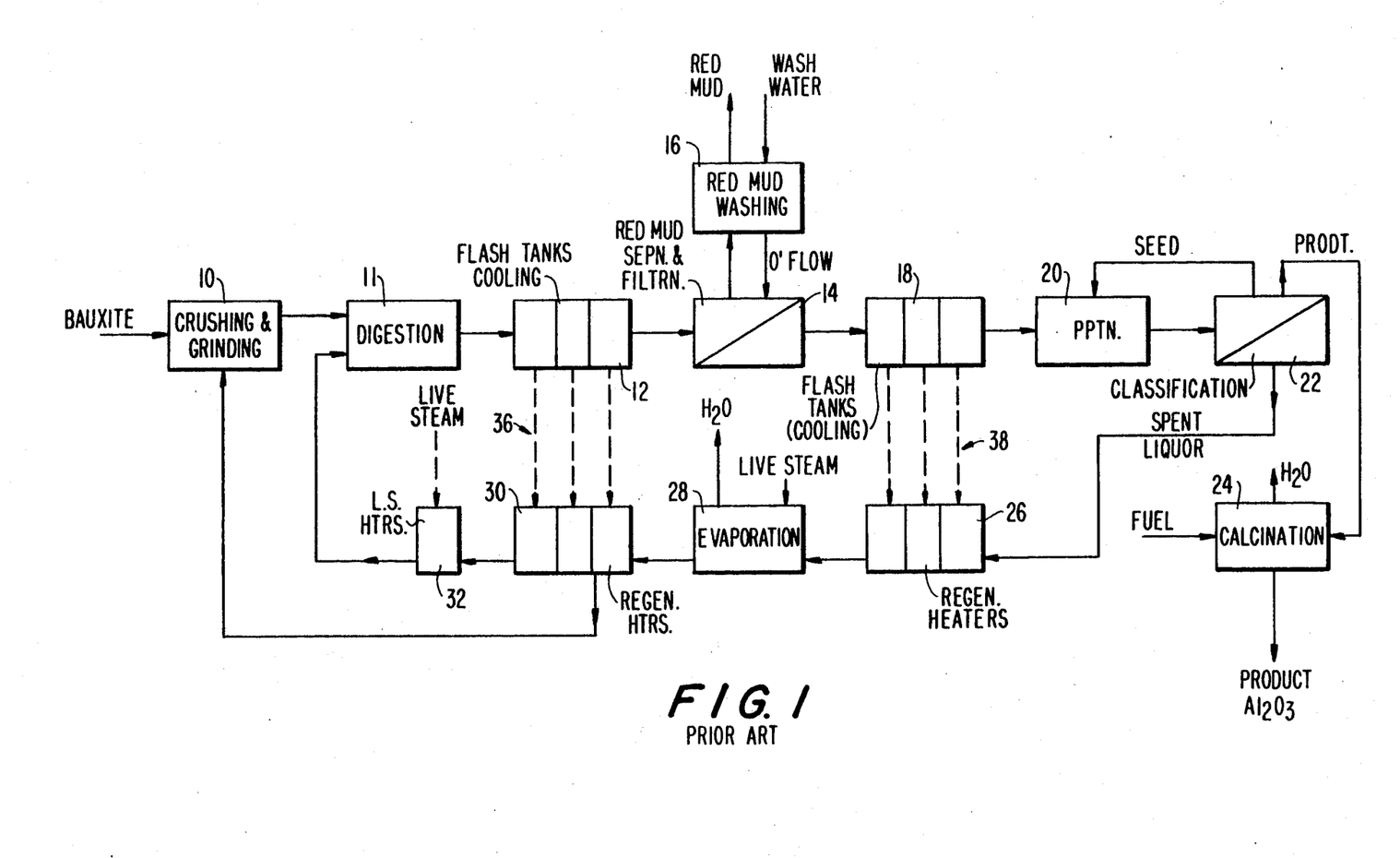
FIG. 1 is a diagrammatic illustration of a typical conventional Bayer process system as known in the prior art.

In the Bayer process, system of FIG. 1, bauxite ore is subjected to crushing and grinding at stage 10 in mixture with a quantity of aqueous caustic liquor, and advanced as a slurry to a digestion stage 11 to which additional aqueous caustic liquor is also supplied. In the digester 11, the slurry of bauxite in caustic liquor is heated, under conditions of elevated (superatmospheric) pressure, to a temperature substantially above the atmospheric boiling point, so as to dissolve the aluminum oxide values in the ore as sodium aluminate. The digested hot liquor or slurry, carrying insoluble ore material ("red mud") and dissolved sodium aluminate, is cooled in stage 12, and the red mud is separated from the liquid of the slurry in a separation and filtration stage 14. The red mud is washed at 16 and discharged, with overflow liquid from the washing stage returned to the main process loop. Typically the washer overflow stream also has to be filtered. After further cooling in stage 18, this liquor, containing the dissolved sodium aluminate, is treated at stage 20 (as by seeding with aluminum hydroxide and stirring) to precipitate aluminum hydroxide.

The aluminum hydroxide precipitate is separated out in classification stage 22 and calcined in stage 24 to obtain alumina ($Al_2O_3$) as the end product, while the remaining caustic liquid ("spent liquor") is recycled, possibly evaporated, regenerated with addition of caustic, and heated to treat fresh quantities of bauxite. Specifically, the spent liquor is regenerated with caustic and heated by heat transfer from the digested slurry stream in successive stages 26 and 30, between which it is concentrated by evaporation in stage 28. In stage 30 the liquor is split into two streams, of which one is conducted to the crushing and grinding stage 10 for mixture with fresh bauxite, while the other is further heated, with external supply of heat in heater 32, and delivered to the digester 11.

Specific process conditions (temperatures, pressures, concentrations, etc.), and the provision of suitable equipment (e.g. pumps for effecting liquor circulation), etc., in such a system are entirely familiar to persons of ordinary skill in the art, and accordingly need not be further described.

In accordance with conventional prior art practice, the cooling stage 12 for the digested slurry and the heating stage 30 for the regenerated liquor are cooperatively constituted as a series of flash heat exchangers 36, wherein successive steps of pressure reduction of the digested slurry (in stage 12) cause flashing of steam, i.e. conversion of some of the slurry water to steam, which condenses (in stage 30) on an exposed surface of a heat-exchange wall having an opposite surface in contact with spent/regenerated liquor to be heated. The flashing in stage 12 cools the digested slurry by abstracting heat of vaporization therefrom, while the condensation of steam in stage 30 heats the spent/regenerated liquor by transferring the heat of vaporization thereto, through the heat-exchange wall. The cooling stage 18 and heating stage 26 are similarly cooperatively constituted as a series of flash heat exchangers 38, functioning in the same manner as exchangers 36.

In this arrangement, since the condensing steam is essentially only water, the problem of scale buildup on uncleanable surfaces is largely or entirely avoided. The efficacy of heat exchange is nevertheless limited by the relatively high boiling point elevation of the caustic digested liquor, as well as by heat losses inherent in the equipment design, so that a substantial external heat supply at stage 32 is required. In addition, the flash evaporation of the hot slurry increases the liquor concentration at a point in the cycle at which increased concentration is undesirable from the standpoint of maximizing liquor productivity in the digestion and precipitation steps.

The method of the invention, in the embodiment now to be described, overcomes these disadvantages, yet without introducing the problems of unremovable scale formation that would result from indirect heat exchange between countercurrent caustic liquor streams respectively in contact with opposite surfaces of a common heat-exchange wall through which the heat is transferred.

Figure 2:
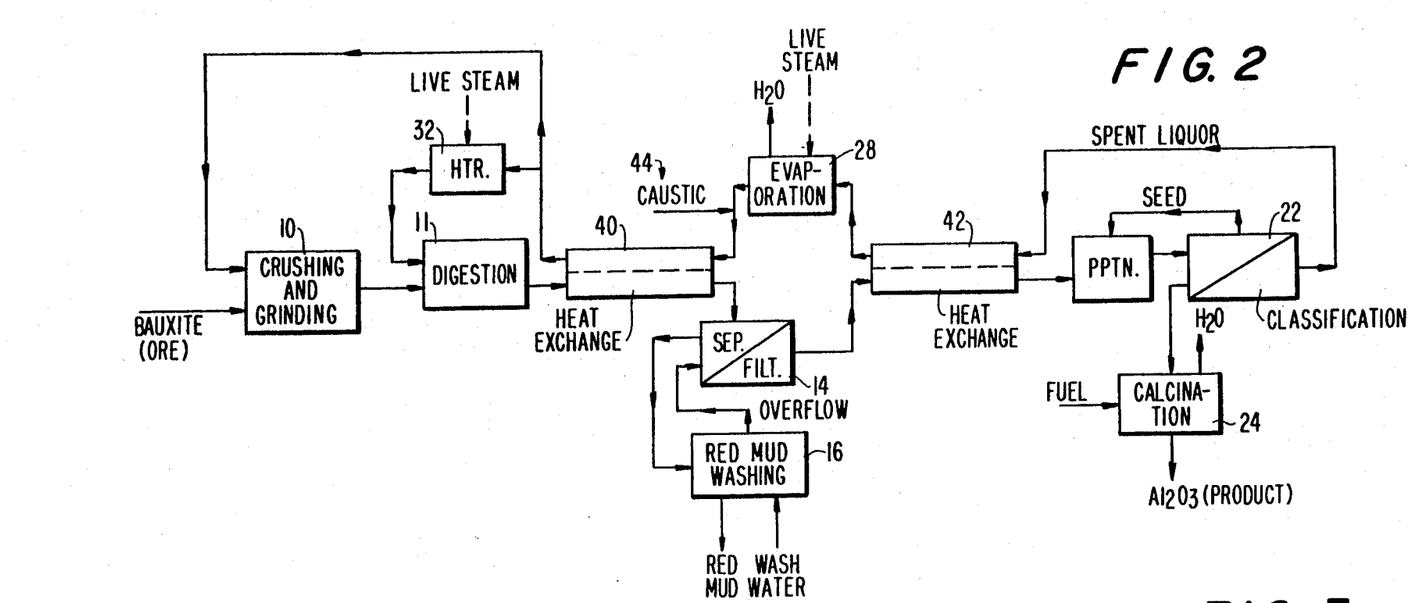
FIG. 2 is a fragmentary illustration, similar to FIG. 1, of a Bayer process operation incorporating an embodiment of the present invention.

A system for practice of the Bayer process incorporating an embodiment of the present method is illustrated diagrammatically in FIG. 2, wherein like stages are identified by like reference numerals. The system of FIG. 2 may be substantially identical to that of FIG. 1, in a functional sense, except that the flash-type heat exchangers 36 (cooling stage 12 and heating stage 30) and 38 (cooling stage 18 and heating stage 26) are respectively replaced, in FIG. 2, by heat-pipe heat exchangers 40 and 42 for performing the method of the invention. Introduction of caustic, to regenerate the spent liquor, is indicated at 44.

Figure 3:
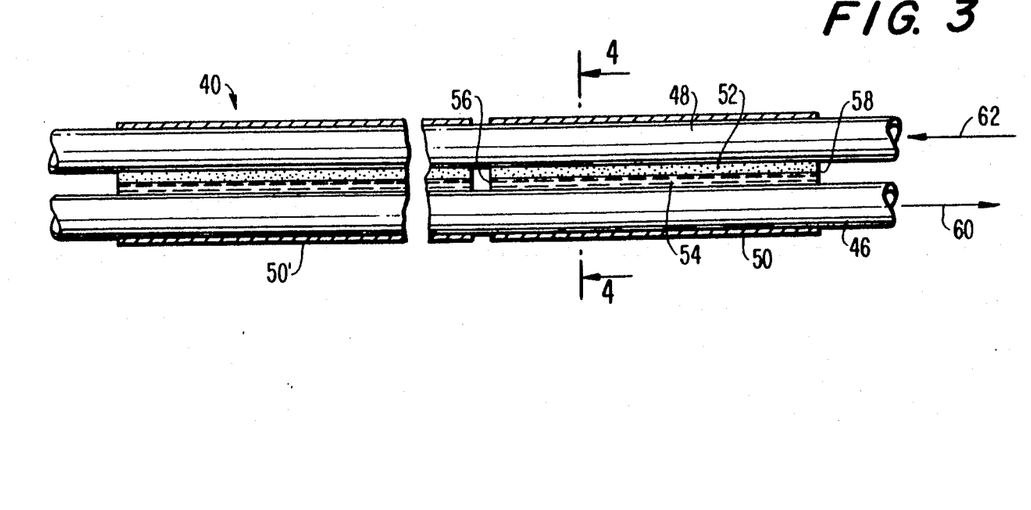
FIG. 3 is a simplified schematic elevational sectional view of one form of heat-exchange arrangement for practicing the method of the invention.
Figure 4:
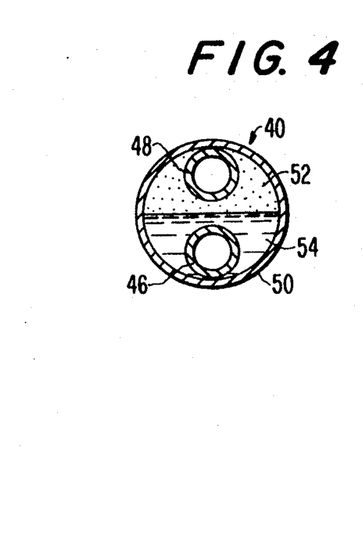
FIG. 4 is a cross-sectional view taken along the line 4—4 of FIG. 3.

The heat exchanger 40 (to which the heat exchanger 42 may be essentially identical in structure and arrangement) is shown in detail in FIGS. 3 and 4. It comprises a first cylindrical, heat-conductive metal tube or conduit 46 for conducting a stream of hot digested slurry from the digester 11; a second cylindrical, heat-conductive metal tube or conduit 48 for conducting a stream of spent/regenerated liquor to be heated for return to the digester; and at least one shell or jacket 50 surrounding both conduits 46 and 48 laterally to define an enclosed volume 52 partially filled with a liquid-state body 54 of fluid heat transfer medium. The conduits 46 and 48 extend horizontally, in vertically spaced parallel relation to each other, with the conduit 46 that carries the hotter stream disposed below the conduit 48 that carries the cooler stream. The jacket 50 is illustrated as a horizontally extending tube or pipe section disposed in axially parallel relation to conduits 46 and 48 and having an inner diameter large enough to encompass both conduits with clearance, the ends 56 and 58 of the jacket being closed (and sealed around the conduits 46 and 48, which protrude through these ends) for containing the fluid heat transfer medium in a closed system.

In this structure, the hot digested slurry passes through the interior of conduit 46 in a first direction (arrow 60) while the spent/regenerated liquor to be heated passes through the interior of conduit 48 in a countercurrent direction (arrow 62). Each stream is isolated from the other, and from the closed volume 52, by the conduit in which it flows. Each conduit is a heat-transmissive or heat-exchange wall, having an inner cylindrical face or surface in contact only with the process liquor stream flowing through it, and an outer face or surface exposed to the interior of the closed volume 52 but isolated from both process surfaces.

The body 54 of liquid-state heat transfer medium is shown as filling only about the lower half of the closed volume 52, so that the lower conduit 46 is fully submerged in this liquid body while the upper conduit 48 is fully exposed above the liquid body, within the closed volume. The fluid transfer medium is selected, with reference to the temperature range involved in the heat-exchange operation, so that it vaporizes (at the pressure in the shell) at a temperature below the temperature at which the hotter process liquor stream (in conduit 46) enters the heat exchange zone defined by jacket 50 but condenses at a temperature above the temperature at which the cooler liquor stream (in conduit 48) enters the heat exchange zone; i.e., the transfer medium has a boiling point below the first-stream temperature but above the second-stream temperature. For the range of temperatures encountered in the Bayer process environment herein described, water is a suitable heat transfer fluid. The heat transfer medium is also selected so that it does not deposit scale or cause corrosion or other surface problems on the conduits 46 and 48 even over very extended periods; an example of such a medium is deionized water containing a small amount of corrosion inhibitor as an additive.

It may be necessary to adjust conditions initially in the closed volume to cause the heat transfer medium to boil, when starting up the system. For instance, if water is being used as the heat transfer medium and the warmer process stream is at 80° C., the heat transfer medium will not boil if the pressure in the closed volume is 1 atm. However, if the pressure in the closed volume is reduced by partial evaporation to, say, $\frac{1}{3}$ atm. at room temperature before the closed volume is sealed, there will be no problem in causing the water to boil at 80° C. Similarly, it is of interest to exclude noncondensable gases (e.g. air) from the closed volume in order to avoid a contribution of the partial pressure of these gases to the total pressure within the closed volume or jacket. Stated more broadly, then, the fluid heat transfer medium and the pressure in the closed volume are mutually selected so that the medium, at that pressure, boils at a temperature below the temperature of the hotter of the two process streams and condenses at a temperature above the temperature of the cooler of the two process streams. Appropriate selection of pressure within the closed volume or jacket thus affords substantial flexibility in the choice of the fluid heat exchange medium.

In the practice of the present method in the heat exchanger 40, hot digested caustic slurry to be cooled is passed through (in contact with the inner surface of) the lower conduit 46 while spent/regenerated caustic liquor is passed in countercurrent direction through (in contact with the inner surface of) the upper conduit 48. Heat transmitted through the wall of conduit 46 to the body of water 50, which is in contact with the conduit outer surface, causes vaporization of water from the body, because the temperature of the hot digested slurry is significantly above the boiling point of water. Thereby, heat of vaporization is abstracted from the digested slurry stream, cooling that stream. The steam thus produced rises into contact with the exposed outer surface of conduit 48, where it condenses, owing to the relatively low temperature of the liquor stream in the latter conduit; in condensing, the steam gives up heat of vaporization which is transmitted through the wall of conduit 48 to heat the liquor stream therein. The water condensed on conduit 48 falls back by gravity through volume 52 into the body of water 54.

This heat transfer operation proceeds, on a continuous basis, as long as the two liquor streams continue to flow along their respective conduits, with theoretically no need to replenish the fluid heat-transfer medium (water) since the heat-exchange system is closed. Scale formation is not avoided, but occurs only on the readily descalable inner surfaces of the conduits 46 and 48, since the outer surfaces of the conduits are exposed only to nonscaling heat transfer fluid.

In the method of the invention, the described closed volume containing fluid heat-transfer medium functions as a heat pipe to provide a simple arrangement which (as a result of the well-known close approach of the heat pipe to isothermal heat transfer) affords heat transfer with essentially no additional degradation of heat as compared to slurry/slurry heat transfer across a single heat exchange wall, while at the same time keeping both surfaces which are in contact with the two slurries equally accessible for cleaning by mechanical means or high-pressure liquid jetting.

Preferably, the shell of the heat exchanger 40 is compartmented into plural segments of convenient length (e.g., ~20 feet) along its length, to permit each section to reach its own equilibrium pressure and minimize the temperature "steps" from section to section, and hence to minimize the degradation of the heat being transferred. Accordingly, plural separate jackets (a second jacket 50' being shown in FIG. 3) are disposed in spaced tandem relation to each other along the conduits 46 and 48, to constitute the heat exchanger 40, with a different equilibrium pressure in each jacket or shell segment.

Very advantageously, the heat transfer method of the invention can be employed in conjunction with use of a tube digester, to realize the benefits afforded by the latter type of digester. In a tube digester, as will be understood by persons of ordinary skill in the art, the actual digestion (at highest temperature and pressure) occurs at one locality of a long tube through which the caustic bauxite slurry is pumped, with gradually increasing temperature until the digestion conditions are reached and traversed. In a simple embodiment, a tube digester suitable for practice of the present invention would have the arrangement shown in FIGS. 3 and 4 and already described, including a horizontal tube 48 carrying the slurry to be heated, and a second horizontal tube 46 carrying the slurry to be cooled, disposed within a common horizontal jacket such as a third larger tube 50, with the tube 48 to be heated above the tube 46 to be cooled, and with the jacket 50 approximately half filled with a suitable non-scaling heat transfer fluid 54 which will boil at the shell pressure at a temperature below that of the slurry in the stream to be cooled and condense at a temperature above that of the slurry in the stream to be heated.

In operation, the fluid in the jacket space 52 is boiled by the hot slurry in the tube 46 submerged in it, and the vapor condenses on the surface of the upper tube 48, transferring the latent heat (which is relatively very large) to the contents of this tube. The condensate drips off and returns to the boiling pool below. The external (jacket) fluid therefore serves only to couple the two heat transfer surfaces (of tubes 46 and 48), and in principle never has to be renewed. Because heat transfer occurs under boiling and condensing conditions at the two surfaces, with the usual very high heat transfer coefficients under these conditions, and there is negligible resistance in the vapor/condensate transfer from one surface to the other, there would be only a very small additional overall resistance to heat transfer compared to the case of heat transfer from one slurry across a common wetted surface to the other. This added resistance can be still further reduced by the use of known means of enhancing heat transfer on the outside surfaces, e.g. by providing fins, ribs, grooving or fluting (not shown) on the outer surfaces of tube 46 and/or tube 48, since these surfaces will not be subject to scaling, and hence the heat-transfer-enhancing feature will not be rapidly submerged by a build-up of scale.

It will be appreciated that the overall effect of the proposal is not to reduce or prevent scaling by either the heating or heated slurry but merely to make all the surfaces prone to scaling equally accessible for chemical, mechanical or hydraulic cleaning. That is to say, the invention in the described embodiment enables non-flashing heat interchange between the two streams, for example in a tube digester, while keeping all scaling problems confined to surfaces for which known descaling techniques exist. Of course, as compared to conventional concentric jacket-and-tube heat transfer between countercurrent streams, the present invention involves provision of two tubes instead of one in the jacket, and usually an increased diameter jacket, i.e., additional capital cost that may to some extent offset the benefit of reduced maintenance costs. As a result, a conventional tube digester may be preferable for those parts of a process circuit where the scale on both sides of the single tube could be readily removed chemically, or where no scale is likely to form, while the heat-pipe tube digester used for the present method, with increased cost per unit heat transfer area, would be used only in those parts of the circuit where scales would otherwise form on a surface or surfaces which cannot reliably be descaled by chemical means.

By way of specific illustration of the economic benefits of the present invention as embodied in a Bayer process operation of otherwise generally conventional character, a comparison may be made between a hypothetical example of such operation employing the invention, and an operation using the flash heat-exchange procedure of the prior art.

Referring to prior art operation in a typical low-temperature Bayer plant (digestion at ~143° C.) as shown in FIG. 1, the stream leaving the digester 11 at 143° C. is to be cooled to the atmospheric boiling temperature for the separation of the red mud (~107° C.) in stage 14, and the spent liquor stream passing to the digesters is to be heated from its original temperature at the test tanks (about 78° C. in current practice) to the maximum temperature which can be achieved by heat recuperation, viz. in the flash heat exchanger series 36. The remainder of the heat required in this stream (to be heated to about 160°–165° C. to balance the colder bauxite slurry stream with which it is mixed to enter the digester and to supply the heat of dissolution of the alumina from the bauxite into the caustic sode solution and achieve a digestion temperature of ~143° C.) has to be provided by steam raised from an external source of energy, which represents a major operating cost in the process.

An analogous second flashing heat recovery system (represented in FIG. 1 by flash heat exchanger series 38) for recovering further heat from the clarified liquor stream after red mud separation into the spent liquor after alumina hydrate precipitation also exists (the vacuum cooling/vacuum heating system) in many Bayer plants, but need not be discussed in detail, since its operation is similar.

Considering the flash heat exchanger series 36 of FIG. 1, the stream leaving the digester at ~143° C. enters the first (20 psi) flash tank of the cooling stage 12, and the temperature of the digested slurry leaving this flash tank after flashing is typically in the region of ~131° C. The flash steam transmitting the heat to the third bank of spent liquor heat exchangers in heating stage 30 therefore leaves the flash tank at ~131° C. Because of the boiling point rise of the liquor as a result of the dissolved salts contained in it, however, this steam will be superheated by the amount of the boiling point rise (e.g., ~5° C.) at the moderate caustic concentrations used in many low temperature Bayer plants, and even ignoring other heat losses and pressure losses in the steam piping interconnecting the flash tank and the heat exchanger shell, this steam will only condense to provide heat on the shell side of the shell and tube exchanger at ~126° C. Typically, shell and tube exchangers in highly scaling environments such as this have an exit approach temperature of 5°-6° C. in average-clean condition. The maximum regenerative temperature which can be achieved for the liquor being heated in this system against the digested slurry initially at 143° C. will therefore be only about 120° C.

Of the very large temperature driving force of ~23° C. which at first sight seems to exist, ~5° C. does not in fact exist as a result of the boiling-point-rise penalty in this type of heat recovery scheme, and another ~12° C. is wasted by the degradation of the heat arising from the stepwise nature of the flashing process and the large size of the temperature steps which typically have to be used. A similar situation also occurs at each of the other two digestion flashing stages and each of the three (typically) regenerative vacuum heating stages. The whole system is clearly not an efficient system of recovering heat, although it does have the advantages that scaling on the outside of the heat exchanger tubes (here heated by condensing flash steam) is largely avoided, except when slurry droplets are carried over in the flashed steam; and that the water condensed from the flashed steam is removed from the process, assisting in achieving an overall water balance, though this liquor-concentrating effect occurs at an undesirable part of the process (between digestion and precipitation), whereas best process productivity would be achieved by having maximum caustic soda concentration in the liquor at digestion and minimum concentration in precipitation.

If, on the other hand, heat transfer from the digester exit slurry at 143° C. to the spent liquor were to be effected (by use of the method of the present invention) without having to interpose a flashing operation, using (for the present method) heat exchangers having overall heat transfer coefficients of average value similar to that in the existing exchangers, and having similar heat exchange areas, there would then be no boiling point loss penalty (no flashing and recondensation of steam from the digested slurry) and no degradation of heat due to flashing operation. It should be possible thereby to achieve a regenerative liquor temperature approximately ~17° C. (5°+12° C.) higher than at present, all the way up the heat exchange train. In practice, it is likely that the overall heat transfer coefficient would be slightly lower, as a result of the double heat transfer involved in the method of the invention, but this could be readily compensated for by a corresponding slight increase in the heat transfer area.

Thus, instead of providing live steam to heat the spent liquor from ~120° C. to ~160° C., it would then only be necessary to provide live steam to heat the spent liquor from ~137° C. to ~160° C. The live steam consumption in digestion would therefore decrease to about 23/40 or ~58% of its present value, to a first approximation.

Since the spent liquor flow rate in digestion in a medium-sized Bayer plant (~1500 m.t. Al$_2$O$_3$/day) is of the order of 600 cfm today, with a liquor density of approximately 78 lb/ft$^3$ and a liquor heat capacity of ~0.85 Btu/lb °F., the heat savings corresponding to the 17° C. (31° F.) savings in the live-steam heating load would be:

$600\ ft.^3/min. \times 78\ lb./ft.^3 \times 0.85\ Btu/lb.(°F.) \times 31°$
$F. \times 1440\ min./day = \sim 1776\ MBtu/day$ or ~1776/1500=1.18 MBtu/m.t. Al$_2$O$_3$.

Against this, it might be necessary to evaporate ~40 cfm of additional water in the plant evaporators to balance the flash evaporation no longer occurring. In fact, a part of this difference could be made up at no operating cost by reducing dilution to the process, which remains excessive in many Bayer plants. Assuming an evaporation economy of 4.5 lb. evaporation/lb. live steam, such as can be achieved in evaporators already in use in some Bayer plants, and full return of live steam condensate from the evaporator to the powerhouse, the heat required would be approximately $40\ ft.^3/min. \times 62.4\ lb./ft.^3$ water $\times$ (1 lb. steam/4.5 lb. water) $\times$
$950\ Btu(net)/lb.$ steam $\times 1440\ min./day = 759\ MBtu/day.$ The net savings would therefore be 1776−759=1017 MBtu/day or 0.68 MBtu/m.t. Al$_2$O$_3$.

While the heat exchanger of FIGS. 3 and 4 is one simple form of structure with which the present invention may be practiced, other and modified heat exchange arrangements also providing heat-pipe operation may alternatively be employed, indeed with advantages for particular situations. Several examples of such alternative structures are illustrated in FIGS. 5-8 and 11.

Figure 5:
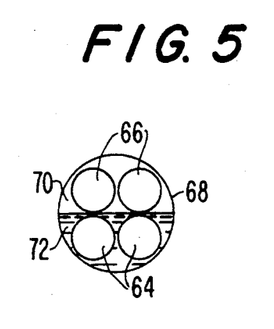
FIG. 5 is a view, similar to FIG. 4, of a modified heat-exchange arrangement suitable for the present method.
Figure 6:
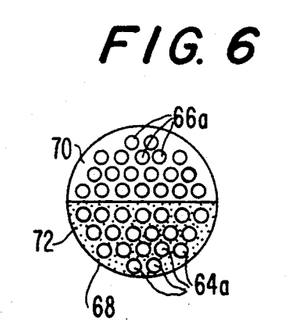
FIG. 6 is a view, again similar to FIG. 4, of another modified heat-exchange arrangement suitable for the present method.

FIGS. 5 and 6 show, in cross-section similar to FIG. 4, multi-tubular heat-pipe tube digesters. In certain instances, the use of a single tube for carrying the stream to be heated or cooled would require a tube of large tube diameter, which would have a small surface area per volume of liquor flowing, and would accordingly necessitate a very great length for the tube digester if a single tube for the flow in each direction is used. In this case, it may be preferable to use two, three, or more tubes for carrying each stream in order to gain in the transfer area per unit length of the device; although the diameter of the jacket tube may increase, the added cost of such increase is likely to be far more than balanced by the reduction in total length of jacket required.

FIG. 5 shows a structure in which the single tube 46 of FIGS. 3 and 4 for the hotter process liquor stream is replaced with two parallel tubes 64 and the single tube 48 of FIGS. 3 and 4 for the cooler process liquor stream is replaced by two parallel tubes 66. As in the structure of FIGS. 3 and 4, all four of these tubes extend horizontally in axially parallel relation to each other, with the two tubes 66 disposed above the two tubes 64. All four tubes are laterally surrounded by a shell or jacket tube 68, which has closed ends (not shown) and defines a closed volume 70 about half-filled with a body 72 of fluid heat-transfer medium; the outer surfaces of the tubes 64 are exposed to the interior of the volume 70 and are immersed in the body 72, while the outer surfaces of the tubes 66 are exposed to the volume 70 above the level of the body 72. Performance of the method of the invention with this structure proceeds in the same manner as in the structure of FIGS. 3 and 4, except that each process liquor stream flows through two tubes rather than one.

As indicated in FIG. 6, the number of tubes carrying each process stream may be further increased. FIG. 6 shows a modification of the FIG. 5 structure (with like features correspondingly numbered) in which the two lower tubes 64 are replaced with a first multiplicity of parallel horizontal tubes 64a immersed in the heat-transfer fluid body 72 in the lower half of the volume 70 defined by jacket 68, and the two upper tubes 66 are replaced with a second multiplicity of horizontal tubes 66a (parallel to each other, and above and parallel to the tubes 64a) having outer surfaces exposed in the upper half of the volume 70, above the level of the fluid body 72. In this structure, the stream to be heated passes through the set of tubes 66a in the upper half, and the stream to be cooled passes through the set of tubes 64a in the lower half. The tubes may be arranged for single-pass operation, with each stream divided into plural parallel flows (in the respective tubes 64a or 66a) that pass unidirectionally through the heat exchange zone; alternatively, the tubes may be arranged to provide multi-pass operation for one or both streams through the heat exchange zone.

Figure 7:
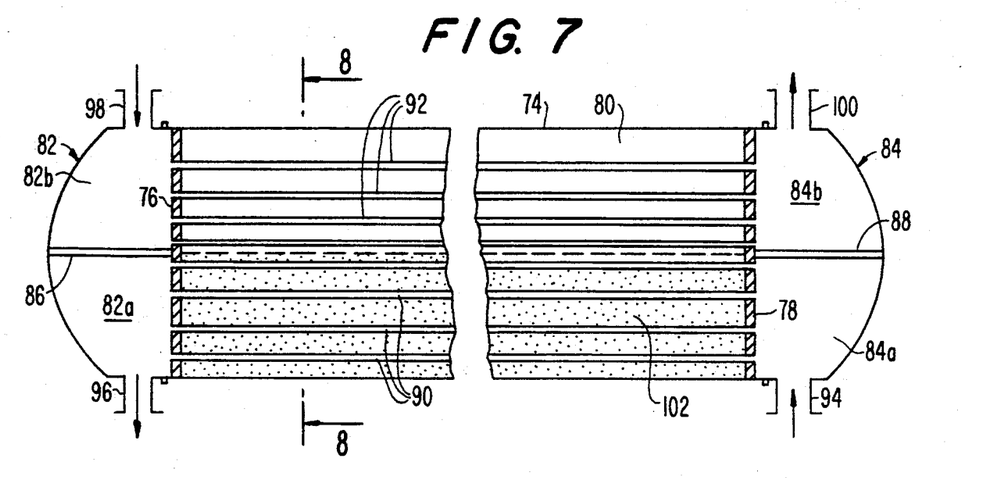
FIG. 7 is a fragmentary schematic elevational sectional view of yet another modified heat-exchange arrangement suitable for the present method.
Figure 8:
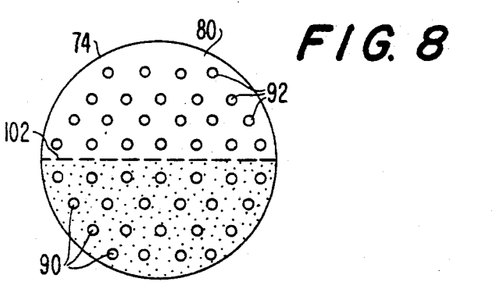
FIG. 8 is a cross-sectional view taken along the line 8—8 of FIG. 7.

FIGS. 7 and 8 illustrate a single pass/single pass multitube shell/tube type heat-pipe heat exchanger for the practice of the present method, also employing a multitude of spaced, parallel, horizontal tubes for each of the two process liquor streams between which heat is to be transferred. The structure includes a generally cylindrical, axially horizontal shell 74 with closed ends, divided internally by two transverse vertical walls 76 and 78 into an elongated central heat exchange zone or chamber 80 and opposite end chambers 82 and 84. Each of the chambers 82 and 84 is divided by a perforation resistant single or multiple-layered horizontal wall (86 or 88) into a lower half (82a or 84a) and an upper half (82b or 84b), the walls 86 and 88 serving to isolate the upper halves of the end chambers from the lower halves so as to prevent fluid communication therebetween. The central chamber 80, unlike the end chambers, has no horizontal dividing wall but is instead arranged for free fluid communication throughout and between its upper and lower portions.

Multiple axially horizontal tubes 90 extend (in spaced parallel relation to each other) through the lower half of the central chamber 80 between the transverse walls or tubesheets 76 and 78. The tubes 90 open through the latter walls into the lower halves 82a and 84a of the two end chambers. Similarly, multiple axially horizontal tubes 92 extend (in spaced parallel relation to each other and to the tubes 90) through the upper half of the central chamber 80 between the transverse walls or tubesheets 76 and 78, and open through those walls into the upper halves 82b and 84b of the two end chambers. The lower tubes 90 correspond to the lower tubes 64a shown in FIG. 6, serving to conduct the hotter of the two process liquor streams (the stream to be cooled) through the heat exchange zone or chamber 80, while the upper tubes 92 correspond to the upper tubes 66a of FIG. 6, serving to conduct the cooler process liquor stream (which is to be heated) through that chamber.

An inlet 94 and an outlet 96 for the hotter process liquor stream open respectively into the lower end half chamber 84a and the lower end half chamber 82a. In like manner, an inlet 98 and an outlet 100 for the cooler process liquor stream open respectively into the upper end half chamber 82b and the lower end half chamber 84b. The inlet 94, half chamber 84a, tubes 90, half chamber 82a, and outlet 96 together provide a continuous unidirectional (single-pass) flow path for the hotter process stream into, through and out of the lower region of the interior of shell 74; the inlet 98, half chamber 82b, tubes 92, half chamber 84b, and outlet 100 correspondingly provide a continuous unidirectional (single-pass) flow path for the cooler process stream into, through and out of the upper region of the interior of shell 74, in a direction countercurrent to the direction of flow of the hotter stream. Those skilled in the art of heat exchanger design will understand that by suitable subdivision of the corresponding half-end spaces by internal baffles (not shown), it will also be possible to provide readily for multi-pass operation with respect to the warmer stream, the cooler stream, or both these streams, if required.

The shell 74 and transverse walls or tubesheets 76 and 78 cooperatively constitute the central chamber 80 as a closed volume, to which the outer surfaces of the lower tubes 90 and of the upper tubes 92 are all exposed. Within this volume there is provided a liquid-state body 102 of a fluid heat-transfer medium, filling the lower half of the volume so as to cover the tubes 90, the tubes 92 being above the level of the body 102 within the chamber 80. As will be understood, in operation the two process streams, flowing in countercurrent direction through the tubes in shell 74 as described, are completely isolated from each other and from the closed volume by the walls 76, 78, 82, and 84 and the tubes 90 and 92, and are also isolated from the outer surfaces of the tubes 90 and 92, which are contacted only by the fluid heat-transfer medium of body 102; i.e., the process liquor streams are in contact only with the inner surfaces of tubes 90 and 92, respectively. Heat from the lower process stream vaporizes fluid of the body 102, and the vapor rises and condenses on the outer surfaces of tubes 92, transferring heat to the upper (cooler) process stream. The condensate returns by gravity to the body 102.

The heat exchanger of FIGS. 7 and 8, like that of FIG. 6, is shown as including approximately equal numbers of tubes (90 and 92, respectively) for each of the two process streams. However, such structures can be arranged to provide a greater number of tubes for one process stream than for the other, to achieve particular operating characteristics, as further discussed below.

Figure 11:
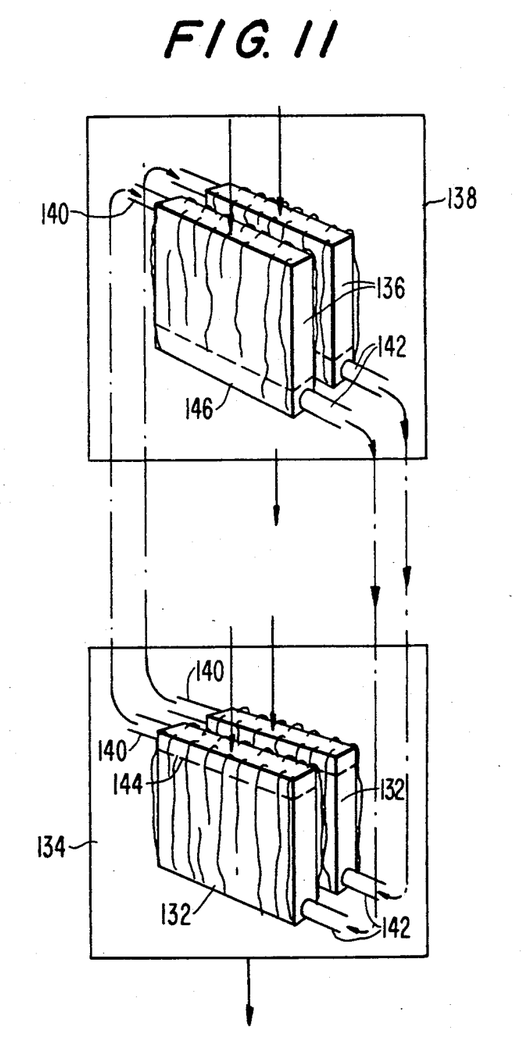
FIG. 11 is a schematic perspective view of a still further modified heat-exchange arrangement suitable for the present method.

A plate-type heat-pipe digester or heat exchanger for the practice of the present method is illustrated very schematically in FIG. 11. In this case, the hotter process liquor stream (to be cooled) is caused to trickle in film flow over a first set of vertically arranged, hollow, heat-transmissive plate structures 132 enclosed within a first shell 134, while the cooler process liquor stream (to be heated) is caused to trickle in film flow over a second set of vertically arranged, hollow, heat-transmissive plate structures 136 enclosed within a second shell 138 at a higher elevation than the plate structures 132 in shell 134. The interiors of the plate structures 132 are connected to the interiors of the plate structures 136 by tubes 140 and 142, so as cooperatively to define closed volumes (each constituted of the hollow interior of a plate structure 132, the hollow interior of a plate structure 136, and the tubes 140 and 142 interconnecting these interiors) for holding a fluid heat-transfer medium. A liquid-state body of the fluid medium largely fills the portion of each such volume within a lower plate structure 132 (to a level 144 therein, leaving some space for vaporization). Thus, heat from the hotter process stream vaporizes fluid of this body, and the vapor rises through tubes 140 to condense within the interior of the associated upper plate structure 136, heating the cooler upper process stream passing over the plate structure 136; the condensate collects within the upper plate structures as indicated at 146, and returns by gravity through tubes 142 to the interior of the lower plate structure.

That is to say, the slurry or liquor to be heated passes in contact with plate surfaces (of structures 136) heated internally by condensation of the heat-transfer fluid vapor generated below by the slurry being cooled passing over the outside of another set of plates 132 enclosing the liquid-state heat-transfer fluid. This enables advantage to be taken of the high heat transfer coefficients and low scaling rates and capital costs of such enclosed plate heat exchange surfaces while keeping all of the scaling which does occur on the outside (accessible) surfaces of the plates. Such a system would also permit a Bayer evaporator to be run on heat directly recovered from a hot slurry while keeping all scalable surfaces accessible.

A group of the shells 134 containing plate structures 132, and an associated group of the shells 138 containing plate structures 136, can be arranged in series. The process stream to be cooled is advanced successively through the series shells 134 in one direction, while the process stream to be heated is advanced through the series of shells 138 (respectively associated with shells 134) in a countercurrent direction.

The method of the invention also has beneficial utility for other specific instances of cooling slurries which scale by means of a second stream liable to scaling while keeping all scalable surfaces accessible. Thus, the method of the invention may be employed in providing a temperature-controlled tube precipitator for use at the front end of a high-ratio Bayer precipitation circuit, to achieve maximum recovery of the large heat of precipitation (now discarded) into the spent liquor, carry out precipitation under plug-flow conditions, avoid the wasteful ratio dilution arising in continuous stirred tanks arranged stepwise, carry high seed charges, etc., which would be otherwise impracticable owing to the danger of scaling on both inside and outside tube surfaces or other surfaces intended for transfer of heat.

More generally, in recent years there have been very rapid developments in the thermal integration of chemical, metallurgical, and other processes. Complex processes (such as the Bayer process) include many process streams requiring heating, and many process streams requiring cooling, and very considerable heat cost savings can often be achieved by seeking the optimum process configuration for interchanging heat between streams in various parts of the process. While it has long been clear that increasing heat recuperation within a process should decrease the quantity and hence the cost of the new heat which must be added to the process from external sources (hence the emphasis placed on heat exchange in the digestion, vacuum cooling/heating, and evaporation sections of conventional Bayer alumina plants), only very recently has it become possible as a result of the availability of improved computer facilities and improved software and algorithms to evaluate systematically the multitude of possible combinations, permutations, and partial-split cases which can arise in a multi-stream process to find the optimum overall heat recovery configuration for truly minimizing the total heating costs. The results of optimization studies already carried out for a number of cases have led to new configurations which are different from those traditionally considered, and which may in fact be counter-intuitive or for various reasons not immediately obvious, but which nevertheless are potentially capable of making significant savings even allowing for the capital and operating costs of the additional heat exchange equipment which may be required. However, one common problem of such theoretical studies to date is that it is often not possible to identify suitable equipment and methods with which the various required heat exchange operations can be performed in practice because of combinations of potential difficulties arising from the nature of the process fluids among which heat must be interchanged in the optimum configuration. Such fluids may have severe tendencies to form scale on one or both sides of conventional heat exchanger surfaces, hindering efficient exchange of heat across such surfaces, or they may have severe tendencies to corrode the heat interchange surfaces from one or both sides unless the latter are constructed of exotic or costly materials; or the fluid streams between which heat needs to be interchanged in the optimum heat recovery configuration are of such a nature that it would be undesirable or disastrous for any cross-exchange of matter from one stream to the other to occur, e.g., for reasons of stream purity or safety, when dangerous contamination or unsafe operating conditions could arise (for example) as a result of a perforation of the heat transfer surface separating the two process streams, or as a result of a leak around seals on such surfaces.

Although the present method has been described above with reference to the benefits of "heat-pipe" type heat exchange mainly for heat transfer between two process liquor streams with strong scaling tendencies (e.g., two scaling liquid streams, two scaling slurry streams, or a scaling liquid and a scaling slurry), and in particular in the Bayer alumina process, where such situations can arise frequently in hydrometallurgical operations, the method in a broader sense is capable of overcoming many or the other practical difficulties noted above which arise in attempts to optimize heat recovery operations in a wide range of industrial processes, including but not limited to the Bayer alumina process.

The invention in this broad sense may be considered as involving process improvements (importantly in the Bayer alumina process, but also in many other chemical, hydrometallurgial, and related processes, some non-limiting examples of which will be noted below) made possible by facilitating the improvement of indirect heat transfer, viz , heat transfer across a heat-transmitting impermeable boundary or boundaries between two or more process liquor streams in such a way that the streams themselves do not come into direct contact with one another. The invention particularly enables improvement of indirect heat transfer at increased efficiency and/or reduced capital cost for equipment and/or reduced operating cost (e.g., for the cleaning or descaling of heat exchange surfaces) from one process liquor stream (the warmer stream) to another process liquor stream (the cooler stream) in a mechanically simple system in which the walls across which heat transfer is effected are contacted on one surface only by one only but not the other of the two process streams, which may consist of ordinary fluids or contain constituents that are scaling, corrosive, abrasive, dangerous, noxious, or lead to undesirable interactions in case of accidental intermixing. This is achieved by causing each of the two process streams between which heat is to be interchanged to flow or be contained in its own conduit having thermally transmitting heat-exchanging walls, and transferring heat (from that surface of the warmer-stream conduit which is not wetted by the warmer stream to that surface or the cooler-stream conduit which is not wetted by the cooler stream by means of a compatible, non-aggressive external fluid heat transfer medium that can be caused to boil at the temperature of the warmer stream and be caused to condense at the temperature of the cooler stream. The fluid heat-transfer medium is contained in a separate closed vessel, or in a closed conduit, or in vessels suitably interconnected by conduits to form a closed chamber of complex geometry, through or around which are arranged the conduits carrying the two process liquor streams so as to permit thermal coupling of those surfaces of the latter conduits which are not in contact with the process liquor streams. The conduit containing the warmer stream is preferably placed below the conduit containing the cooler stream so as to permit the thermal coupling of those heat transfer surfaces of these conduits that are not wetted by the respective process streams to be achieved by the mechanically very simple thermosiphon (wickless heat pipe) principle, though particular applications may utilize other, more complex means of achieving the external thermal coupling, in which the external heat transfer medium is circulated by mechanically complex methods such as by pumping or by using heat-pipe-with-a-wick-type means of recirculating the heat transfer medium.

The simplest configuration of such a device is represented by the horizontally arranged double tubular heat exchanger of FIGS. 3 and 4. The subdivided horizontal multitube shell and tube heat exchanger (FIGS. 7 and 8) is a modification of this structure. Most of the following discussion will refer to one of these shell and tube configurations, but is not limited to these geometries. Many other equipment designs may be used, including normal thermosiphons, plate-type heat exchangers (FIG. 11), partially split spiral heat exchangers (FIGS. 9 and 10), etc.

Figure 9:
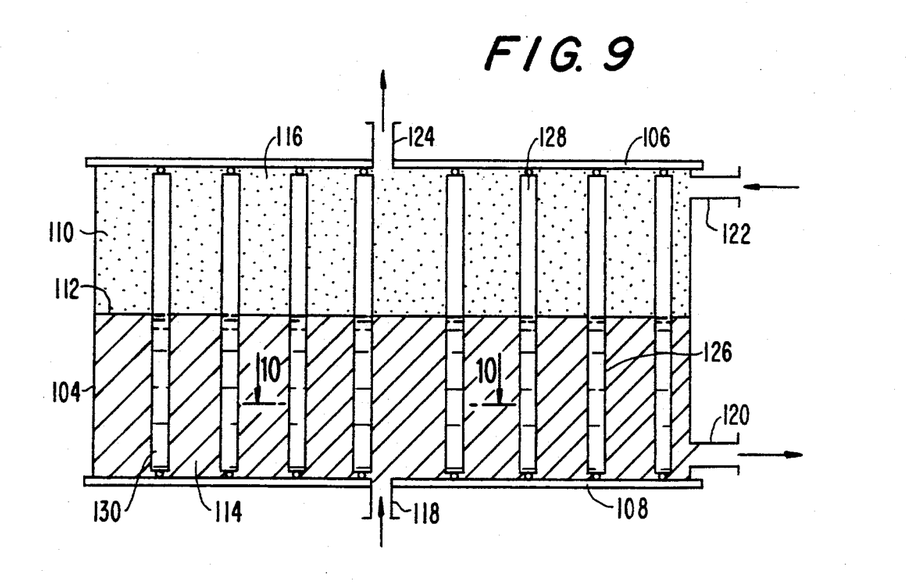
FIG. 9 is a schematic elevational sectional view of a further modified heat-exchange arrangement suitable for the present method.
Figure 10:
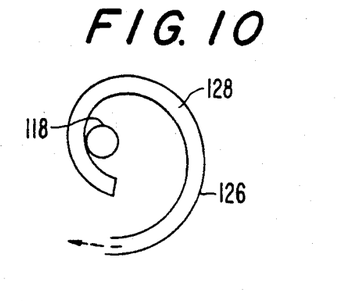
FIG. 10 is a fragmentary sectional plan view taken along the line 10—10 of FIG. 9.

A heat exchanger of spiral exchanger configuration for performing the present method is shown in FIGS. 9 and 10. This structure includes an axially vertical cylindrical jacket 104 having a removable top cover 106 and a removable bottom cover 108 cooperatively defining an interior chamber 110 which is divided by a horizontal septum 112 into a lower half chamber 114 for a hotter process liquor stream and an upper half chamber 116 for a cooler process liquor stream, the septum serving to isolate the two streams from each other. A central inlet 118 is provided in the bottom cover to admit the hotter stream to the lower half chamber 114, and an outlet 120 for that stream is provided in the lower portion of the jacket 104. An inlet 122 for admitting the cooler process stream to the upper half chamber 116 is provided in the upper portion of the jacket, while a central outlet 124 for the latter stream it provided in the top cover.

Centered within the chamber 110, and extending through the septum 112 from the top cover to the bottom cover, is an axially vertical, heat-transmissive (e.g. metal-walled), hollow spiral heat-exchange element 126, defining an internal closed volume 128 for holding a fluid heat-transfer medium. A liquid-state body 130 of this medium fills the lower half of the volume 128, viz. to about the level of the septum 112. It will be seen that the structure of FIGS. 9 and 10 thus defines a continuous spiral lower channel for flow of the hotter process stream, from the inlet 118 to the outlet 120, in contact with the lower portion of the walls of element 126 that face away from volume 128, and similarly defines a continuous upper spiral channel for flow of the cooler process stream from inlet 122 to outlet 124 in like contact with the upper portion of element 126, the two flows being countercurrent to each other and completely isolated from each other and from the closed volume 128. In operation, heat from the lower (hotter) process stream vaporizes fluid of the body 130 in the lower portion of element 128; the vapor, rising, is cooled so as to condense in the upper portion of volume 128, heating the upper (cooler) process stream, with return of condensate by gravity to body 130 within the volume.

Advantages that may be realized in various applications of the present method of heat exchange thus broadly defined, i.e. in addition to those benefits mentioned above for heat transfer between process liquor streams that tend to form heat-insulating scales on one or both sides of the surfaces of normal liquor/liquor heat exchangers may now be explained.

First: laboratory work has indicated that in many cases it may be possible to reduce the rate of formation of scales on the inside walls of heat exchanger tubes quite considerably or even entirely even in the case of strongly-scaling liquors such as Bayer plant liquors and slurries by greatly increasing the flow velocity of the stream in the heat exchanger tubes (or, more generally, along heat exchange surfaces) at the expense of a considerably increased frictional pressure drop and hence pumping cost. In principle, in the case of heat transfer between two scaling liquor streams respectively in contact with opposite sides of a heat exchange wall, it would therefore seem possible to avoid scaling on both sides of the wall by increasing the flow velocities of both streams. In practice, in most industrial heat exchangers, such as shell and tube types, it is possible to control the flow velocity reasonably precisely on the tube side, but not on the shell side, which is typically of very complex geometry and which typically also cannot be reached for easy removal of the scale that will certainly form there owing to inability to provide the requisite high (scale-preventing) flow velocity uniformly over this side of the wall. Where the high tube-side velocities and consequent high fluid pumping costs required to greatly minimize or eliminate scale deposition can be justified economically, the present method provides a way of exchanging heat between two potentially scaling liquor streams (without flashing of either) that permits scale-free or reduced-scaling operation by flow-velocity control of both streams, because both heat exchange surfaces subject to scaling may be of a type (e.g. tube-side surfaces, as in FIGS. 3-8) as to which such control is feasible.

Second: if the volumetric flow rates of the two streams between which heat is to be transferred are different, or if the minimum velocities for greatly reducing or preventing the formation of scale on the respective heat transfer surfaces (as just described) are different for the two streams, then the use of an improved multitube heat-pipe-type heat exchanger of the type shown in FIGS. 7 and 8, for instance, will permit ready adjustment to these situations by having different numbers of tubes for the "warmer" and "cooler" streams between which heat is to be transferred so as to separately achieve the optimum tube-side velocity for each stream individually.

Third: it has long been known that certain types of scale can be removed by chemical means; for instance, sodalite-type scales (sodium aluminosilicates) which form on the heat exchange surfaces of many Bayer-plant heat exchangers can be removed by periodically shutting down the heat exchanger and circulating through the tubes a dilute solution of a mineral acid, suitably inhibited by a corrosion inhibitor from attacking the metal (mild steel, in this case) heat exchange surfaces themselves. However, experience has shown that in addition to introducing such a chemical descaling agent, it is necessary for efficient descaling to circulate it past the heat exchange surfaces at a velocity equal to or greater than some minimum value so as to assist in "scrubbing" the scale material from the surface and/or to carry off the dissolved material. While such a minimum velocity can be provided relatively simply on the tube side of a conventional shell and tube heat exchanger, for example, the complex geometry and relatively enormous cross-section for flow on the shell side make it extremely difficult (or impossible on a multitube exchanger) to achieve such a velocity uniformly on the shell side. Hence, once the scale forms on the shell side in an exchanger transferring heat between a shell-side and a tube-side stream, it is very difficult to chemically remove the scale from the shell side of the heat exchange surfacer, even using a chemical descaling agent where a suitable one exists. The present method permits the more efficient use of a chemical descaling agent to remove the scales formed by both process liquor streams, since both streams are contained in separate conduits amenable to permitting independent control of the velocities of the chemical descaling agent (or chemical descaling agents, in case different solvents are needed for the scales deposited by the two process streams) in each conduit or set of conduits.

Fourth: when very different scaling rates exist for the two process liquor streams, it is possible in a heat exchanger configuration of the type shown in FIGS. 7 and 8, for example, to arrange for different total heat exchange surface areas to be installed for the "warmer" and the "cooler" streams in order to partly compensate for this difference so as to reduce the total time spent idle by the expensive equipment for purposes of descaling. For instance, if the "cooler" liquor scales at twice the rate of the "warmer" liquor, it is possible to install approximately twice the tube surface area for the "cooler" liquor (with suitable multi-pass arrangements, if required, to maintain adequate tubeside velocities) as for the "warmer" liquor, so that the faster fall in heat transfer coefficients for the cooler stream "side" of the heat exchanger will be compensated by a larger heat transfer area and the heat exchanger as a whole will only need to be cleaned when the slower-scaling tubes really require cleaning. Again, with approximately twice as many tubes provided for the faster-scaling liquor as for the slower-scaling liquor, the tubes for the faster-scaling liquor can be arranged in two banks, one of which can be in operation while the other has a chemical descaling agent being circulated in it, with alternation of the cooler fluid and cleaning medium through the two banks, so as to maintain a high average heat transfer coefficient for the faster-scaling fluid. This second alternative might be particularly attractive when there is a particularly large difference in the rates of scale formation by the two process liquors.

Fifth: it is sometimes necessary to exchange heat between streams which are highly corrosive to normal low cost materials of construction for industrial heat exchangers, such materials being typically common metals (steel, stainless steel, brass, etc.) providing high thermal conductivities to permit efficient passage of the heat through the heat exchange walls. For instance, it has been proposed to use a tube digester for carrying out leaches in heated acid streams of uranium ores. When the process liquor stream being heated is of a type that chemically attacks ordinary metallic heat transfer surfaces, it is possible to use heat exchangers of materials which are immune to such attack, but generally these fall into one of two categories: tube materials such as glass, polytetrafluoroethylene, or graphite, which are immune to attack by the particular fluid or fluids, but which are typically fragile, and/or are expensive per unit heat exchange surface area, and/or are relatively poor conductors of heat, and which therefore add considerably to the total resistance to heat transfer from one fluid stream to the other; and metallic materials which have reasonably high to very high thermal conductivities, and which typically have high strengths, but which depending on the fluids to be contacted and the process temperatures may need to be quite exotic metals or alloys of high initial cost, e.g., tantalum, nickel, special stainless steels, Monel, Inconel, Hastelloy, etc. In recent years, plate material of common metals (steel, copper, etc.) clad with a thin continuous surface of another metal on one side (e.g., by explosive bonding processes) has become available and can be used for fabricating heat exchange surfaces suitably protected against an aggressive medium on one side, such material being readily fabricated into tubing largely of a relatively cheap metal protected on the inside by a thin and relatively inexpensive layer of a second more exotic metal or alloy. In dealing with corrosive process liquor streams, use of such tubing in an improved heat exchanger configuration such as those of FIGS. 3-8 would provide a relatively low-cost but corrosion-resistant heat exchange method, since the tubing material would be relatively cheap, depending on a cheap metal for strength and only a very thin layer of more exotic material for corrosion resistance, and simultaneously the bulky and potentially expensive pressure shell of the apparatus could be made entirely of the inexpensive metal, as long as the fluid heat transfer medium in the closed volume is selected to be compatible with this metal. Since this heat-transfer medium is not in direct contact with either of the process streams, it can normally be chosen quite independently of the process fluids between which heat is to be interchanged, apart from considerations of temperature compatibility; i.e., a friendly coupling medium can almost always be found. In addition, since the fluid transfer medium remains in place in its own containing vessel or conduit, it can be treated, if necessary, once only with a corrosion inhibitor, for example. Since this heat transfer medium normally is not discharged or replenished, it is even possible to consider the use in it of highly efficient and cheap permanent corrosion inhibitors which cannot normally be considered for safety reasons, e.g., chromates.

Sixth: the present method has even greater advantages where heat is to be exchanged between two process liquor streams having different corrosive properties, since the tubes or heat exchange surfaces for the "warmer" and "cooler" corrosive streams can be made of or clad with different exotic metals or alloys each selected to efficiently resist the corrosive effects of only one of the process liquors; i.e., it is no longer necessary to find a single material of construction which is resistant to corrosion by both liquors, or to clad a metal with two different other metals, one on each side.

Seventh: the present method also affords considerable advantages when the process liquor streams between which heat is to be interchanged are neither corrosive nor scaling, but consist of highly abrasive slurries of solid particles in a carrier fluid, such as are often encountered in the metallurgical and mining industries, since in this case the heat transfer tubes (or other surfaces) can be made of normal inexpensive metals and clad or coated only on the side contacted by the process liqour stream with a layer of abrasion-protective material. For instance, it is known in the Bayer process that highly abrasive slurries of solids in caustic soda solutions can often be handled effectively with little abrasive wear in nickel-surfaced piping, even though nickel is a relatively soft metal. The benefits are particularly significant where the two abrasive process liquor streams require different surfacing materials for their efficient containment.

Eighth: the present method provides important advantages when heat has to be interchanged between pairs of process liquor streams which are scaling/corrosive, scaling/abrasive, and corrosive/abrasive, as well as the scaling/scaling, corrosive/corrosive, and abrasive/abrasive cases which have been considered separately above, for the reasons already discussed.

Ninth: in certain processes (e.g., in the biochemical, pharmaceutical or food industries), it may be desirable to transfer heat between one process liquor stream (e.g., a waste stream, containing undesirable, noxious, or toxic constituents) and a second process liquor stream (e.g., a stream containing a food or pharmaceutical product or intermediate) the contamination of which by the constituents of the first stream cannot be tolerated, e.g., for hygienic or health reasons. In principle, such heat exchange could be carried out in any indirect heat exchanger, but in practice, this could lead to disastrous results if the heat exchange surfaces became perforated at any point for any reason, or if a leak occurred in the seals around the ends of the heat exchange surfaces. The present method, wherein each process liquor stream is separately contained in a separate conduit, and the heat is transferred from conduit to conduit simply but at high efficiency and with little loss of temperature driving force by a separate, "external" heat transfer medium, offers distinct advantages for such operations, owing to the fact that for cross-contamination of the two process streams to occur in the heat exchanger it would be necessary for both conduits carrying the two process streams to perforate simultaneously, or for two sets of heat exchanger surface seals to leak simultaneously, which is obviously far less probable than for a single perforation or a single seal leak to occur. By suitably continuously monitoring the "external" heat transfer medium coupling the two heat exchanging conduits carrying the two process streams, the occurrence of any single conduit wall perforation or seal leak could be detected as soon as it occurred, and the heat exchanger could be shut down immediately before there was any possibility of a second perforation or seal leak and resultant cross-contamination. For instance, if each process stream contains at least one dissolved electrolyte and the "external" coupling heat transfer medium consists of distilled water, such monitoring can be carried out by continuously measuring the electrical conductivity of the coupling heat transfer medium by means of a conductivity probe built into its containing vessel or conduit.

Tenth: with the two process liquor streams between which heat is to be interchanged contained in conduits of very simple geometry (e.g., as in FIGS. 3-8) all of which are readily accessible throughout, the present method has considerable value as a "sanitary" heat exchanger for food, biochemical, pharmaceutical, and similar industries where thorough cleaning and/or sterilization of equipment are essential at intervals, with the benefit of highly efficient heat exchange with little loss of temperature driving force.

Eleventh: in many complex processes the optimum heat transfer configuration may well involve heat exchange between streams which might come from very different parts of a complex plant (e.g., a petrochemical complex) and which might react undesirably or dangerously with each other should they chance to come into contact with each other in the heat exchange equipment. For instance, run-away chemical reactions leading to explosions, production of noxious byproducts or fumes, etc., could occur. Use of the present method for such heat exchange can greatly reduce the possibility of such undesirable events, and thereby greatly increase the practicability of such complex optimum heat recovery systems. It should also be noted that the heat exchange performed by the present method can be stopped essentially instantaneously, if required, by simply venting the coupling heat transfer medium.

By way of example, the present method offers advantages for efficiently extracting safe heat with little loss in temperature driving force from a coolant stream heated in a nuclear reactor (which may become irradiated or contaminated in the reactor by traces of radionuclides) into a chemical plant process stream while interposing for security reasons a second independent "stationary" heat transfer medium (the "external" coupling medium) between the process stream and the stream which enters the reactor. Similar benefits could be also achieved in use of the present method for preheating boiler feedwater streams for high-pressure boilers, where contamination of the feedwater has to be avoided at all costs, by hot but "dirty" process streams in plants where close integration of the process thermal cycle and a cogenerating or non-cogenerating powerhouse/boilerhouse is desirable in order to minimize heat costs as part of an optimum heat recovery system.

Many combinations of the individual benefits noted above may be possible in special circumstances. The overall effect will be to make various theoretical schemes of optimal heat recovery in complex processes more practically effectable, less costly to implement, and safer to operate.

It is to be understood that the invention is not limited to the procedures and embodiments hereinabove specifically set forth, but may be carried out in other ways without departure from its spirit.

We claim:

1. In a Bayer process treatment of bauxite where a slurry of bauxite in caustic liquor is digested at high temperature and pressure to dissolve alumina values as sodium aluminate, and separated into solids and a pregnant liquor stream, from which aluminum hydroxide is precipitated leaving spent liquor, a method of transferring heat from the hot digested slurry through two heat exchange walls to fresh caustic bauxite slurry while inhibiting creation of scale on more than one surface of each such heat exchange wall, comprising causing the hot digested caustic slurry to pass in contact with one face of a heat exchange wall and thereby transferring heat from said digested slurry to a heat transfer fluid in contact with the other face of said wall, and causing fresh caustic bauxite slurry to pass in contact with one face of another heat exchange wall while presenting the aforesaid heated heat transfer fluid into contact with the other face of said last-mentioned wall, whereby heat from the digested slurry is transferred into the fresh caustic slurry, said transfer fluid being non-scale-forming and said heat exchange walls being each exposed to caustic liquor on only one face thereof, said transfer fluid being essentially in liquid state when it receives heat from the hot slurry through the first-mentioned wall and being thereby vaporized, the aforesaid transfer of heat from the said transfer fluid occurring from vapor state of the latter and comprising condensation at the second-mentioned wall, said transfer fluid thereby returning to liquid state, and said transfer fluid in said last-mentioned liquid state being recycled to the body of transfer fluid in liquid state that is in contact with the first-mentioned wall, said heat thus transferred from the digested slurry to the fresh slurry thus comprising heat of vaporization of the non-scale-forming transfer fluid.

2. A method for transferring heat from a first process liquid stream to a second process liquor stream which is initially at a temperature lower than that of the first stream, comprising the steps of passing the first and second streams in contact with, respectively, a first surface of a first heat-transmissive wall and a first surface of a second heat-transmissive wall, each of the walls having a second surface which is opposed to the first surface thereof and is exposed to a closed volume for containing a fluid, the streams being isolated from each other, from the second surfaces of both walls, and from the volume; maintaining a preselected gas pressure within the volume; and maintaining, in the volume, a liquid-state body of a fluid heat transfer medium in contact with the second surface of the first wall but only partly filling the volume, the medium and the pressure being mutually selected such that at said pressure, the medium has a boiling point lower than the initial temperature of the first stream but higher than the initial temperature of the second stream such that the medium in the volume is partially in vapor state owing to transfer of heat to the body from the first stream through the first wall, the second surface of the second wall being disposed for condensation thereon of vapor-state transfer medium in the volume by transfer of heat to the second stream through the second wall, with return of condensed transfer medium from the second surface of the second wall to the body, the second wall being disposed above the first wall, and the closed volume being arranged for free fluid communication between the respective second surfaces of these walls, such that vapor-state transfer medium rises from the liquid-state body to the second surface of the second wall within the closed volume, and condensed transfer medium returns by gravity from the second wall to the body, wherein aid first and second process liquid streams are streams that are abrasive to surfaces with which they come into contact, and wherein said fluid heat-transfer medium is a non-abrasive fluid.

3. In a Bayer process treatment of bauxite where a slurry of bauxite in caustic liquid is digested at high temperature and pressure to dissolve alumina values as sodium aluminate, and separated into solids and a pregnant liquor stream, from which aluminum hydroxide is precipitated leaving spent liquor, a method of transferring heat from the pregnant liquor through two heat exchange walls to spent liquor while inhibiting creation of scale on more than one surface of each such heat exchange wall, comprising causing the pregnant liquor to pass in contact with one face of a heat exchange wall and thereby transferring heat from said pregnant liquor to a heat transfer fluid in contact with the other face of said wall, and causing spent liquor to pass in contact with one face of another heat exchange wall while presenting the aforesaid heated heat transfer fluid into contact with the other face of said last-mentioned wall, whereby heat from the pregnant liquor is transferred into the spent liquor, said transfer fluid being non-scale-forming and said heat exchange walls being each exposed to caustic liquor on only one face thereof, said transfer fluid being essentially in liquid state when in receives heat from the pregnant liquor through the first-mentioned wall and being thereby vaporized, the aforesaid transfer of heat from the said transfer fluid occurring from vapor state of the latter and comprising condensation at the second-mentioned wall, said transfer fluid thereby returning to liquid state, and said transfer fluid in said last-mentioned liquid state being recycled to the body of transfer fluid in liquid state that is in contact with the first-mentioned wall, said heat thus transferred from the pregnant liquor to the spent liquor thus comprising heat of vaporization of the non-scale-forming transfer fluid.

4. A method according to claim 1, 2, or 3, wherein each of said walls comprises at least one conduit, through the interior of which one of the process liquor streams passes; and wherein the conduits are laterally enclosed together within a jacket defining said closed volume and partially filled with said fluid heat transfer medium.

5. A method according to claim 4, wherein each of said walls comprises a plurality of conduits.

6. A method according to claim 4, wherein said conduits extend generally horizontally.

7. A method according to claim 4, wherein a plurality of closed volumes isolated from each other are respectively provided by a plurality of volume-defining jackets disposed in spaced tandem relation to each other along the length of said conduits, each of said volumes containing a body of a fluid heat-transfer medium in liquid state as aforesaid, and wherein different equilibrium pressures are respectively maintained in different ones of said volumes.

* * * * *